(12) United States Patent
Verschuren et al.

(10) Patent No.: US 8,680,762 B2
(45) Date of Patent: Mar. 25, 2014

(54) DEVICE AND METHOD FOR LIGHTING

(75) Inventors: Coen A. Verschuren, Eindhoven (NL); Herbert Lifka, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 351 days.

(21) Appl. No.: 13/131,112

(22) PCT Filed: Nov. 23, 2009

(86) PCT No.: PCT/IB2009/055280
§ 371 (c)(1), (2), (4) Date: May 25, 2011

(87) PCT Pub. No.: WO2010/064163
PCT Pub. Date: Jun. 10, 2010

(65) Prior Publication Data
US 2011/0233592 A1 Sep. 29, 2011

(30) Foreign Application Priority Data

Dec. 2, 2008 (EP) .................................... 08170470

(51) Int. Cl.
*H01L 51/50* (2006.01)
*H01L 51/52* (2006.01)
*H01L 51/56* (2006.01)

(52) U.S. Cl.
USPC ............. 313/506; 313/509; 313/503; 445/24; 445/25

(58) Field of Classification Search
USPC ................. 313/500–512; 445/24, 25
See application file for complete search history.

(56) References Cited

U.S. PATENT DOCUMENTS

| | | | |
|---|---|---|---|
| 6,424,093 B1 * | 7/2002 | Mir et al. | 313/506 |
| 7,221,092 B2 * | 5/2007 | Anzai et al. | 313/506 |
| 7,733,016 B2 * | 6/2010 | Lambright et al. | 313/509 |
| 8,040,043 B2 * | 10/2011 | Nakayama et al. | 313/504 |
| 8,053,176 B2 * | 11/2011 | Kawai et al. | 445/24 |
| 2002/0158574 A1 | 10/2002 | Wolk et al. | |
| 2004/0119028 A1 | 6/2004 | McCormick et al. | |
| 2007/0090751 A1 | 4/2007 | Cok et al. | |
| 2008/0054802 A1 | 3/2008 | Cok | |
| 2009/0079339 A1 * | 3/2009 | Kang et al. | 313/504 |

FOREIGN PATENT DOCUMENTS

| | | | |
|---|---|---|---|
| JP | 04255592 A | * | 9/1992 |
| JP | 08259938 A | * | 10/1996 |
| WO | 0207235 A1 | | 1/2002 |
| WO | 2005059636 A1 | | 6/2005 |
| WO | 2008027178 A1 | | 3/2008 |

OTHER PUBLICATIONS

Nakamura et al., "51.3: 2.1-inch QCIF+Dual Emission AMOLED Display having Transparent Cathode Electrode", 2004, pp. 1403-1405, Japan.

* cited by examiner

*Primary Examiner* — Mariceli Santiago
(74) *Attorney, Agent, or Firm* — Mark L. Beloborodov

(57) ABSTRACT

It is presented a method for producing a lighting device (1) comprising an Organic Light Emitting (abbreviated OLED) device (1) and a transparent image (I), the OLED device (2) comprising a first portion (P1) with reduced light output capacity. A portion of the transparent image, having a first tone (T1), is at least partially overlapping the first portion (P1) of the OLED device (2). It is also presented a lighting device (1).

17 Claims, 7 Drawing Sheets

DEVICE AND METHOD FOR LIGHTING

TECHNICAL FIELD

The technical field of the present invention is lighting. More specifically, the present invention relates to a lighting device, in particular a lighting device comprising an OLED device.

BACKGROUND OF THE INVENTION

Organic Light Emitting Diode (abbreviated OLED) devices are in several aspects seen as the future in various lighting systems, having attractive features such as a great range of colors, which may be used for e.g. ambient lighting or for personalized devices. For instance, full 2-dimensional grayscale images and logotypes can be manufactured in a single OLED.

In order to achieve full color patterning of an OLED device, a transparent color foil placed in front of the OLED device may be utilized. It is in the interest of companies selling and developing lighting devices to be able to provide such full-color images of a high quality.

SUMMARY OF THE INVENTION

It is with respect to the above considerations and others that the present invention has been made.

In view of the above, it would therefore be desirable to achieve an improved OLED device for ambient lighting. In particular, it would be advantageous to achieve an OLED device presenting a full-color image with enhanced contrast.

To better address one or more of these concerns, in a first aspect of the present invention there is provided a method for producing a lighting device comprising an Organic Light Emitting Diode (abbreviated OLED) device and a transparent image comprising a portion with a first tone, the OLED device comprising a light emitting component, the method comprising:

reducing a light output capacity of a first portion of the light emitting component to a first light output level, said first portion corresponding to the portion with the first tone of said transparent image, and applying the transparent image onto the OLED device, wherein said portion with the first tone of said image is, at least partially, overlapping said first portion of the light emitting component.

Light output capacity should be construed as the amount of light that can be emitted from the light emitting component. Throughout the description, reduction of light output capacity of the light emitting component and the reduction of the light emitting capacity of the OLED device as such will be used interchangeably.

A transparent image in this context is to be construed as a pattern, picture, etc, in which each tone of the image has a certain degree of transparency, e.g. a lighter tone of the transparent image lets a greater portion of light pass through that portion, than for a portion of the image with a darker tone.

A tone of the image is defined as a color tone or gray scale tone, e.g. the luminance of that portion of the image.

The light emitting component as referred to herein is to be understood to as either individually or any combination of a light emitting layer, conductive layer, transport layer and charge injection layers of the OLED device.

In one embodiment, applying the transparent image may comprise applying a transparent foil comprising the transparent image onto the OLED device. Alternatively, applying the transparent image onto the OLED device may comprise printing the transparent image onto the OLED device.

Beneficially, the present method may be used to produce an energy-saving lighting device presenting a high contrast color or gray scale image. In particular, the inventive lighting device may provide a method to produce a high contrast color or gray scale image presented on the lighting device, wherein portions with reduced light output capacity are selected depending on the color tones of the image to be presented on the specific lighting device.

An image based on the transparent image to be applied to the OLED device may thus be patterned onto the OLED device by reducing its light output capacity of selected portions, wherein the transparent image may be applied onto the patterned image, the transparent image at least partially overlapping the patterned image of the OLED device. For instance, darker portions in the foil image provides for reducing the light output capacity of the OLED device accordingly. Thus, dark portions of the foil image may really become dark and the contrast of the foil image may be enhanced when the OLED device is in an ON-state. A patterned OLED device in this context is to be construed as an OLED device having at least one portion of the light emitting layer with reduced light output capacity and thereby giving rise to a pattern when the OLED device is in an ON-state.

In addition, an effect of less current consumption in the OLED device may be achievable, as no current or less current may flow through portion(s) with reduced light output capacity, in comparison with an ordinary, unpatterned, lighting device comprising an OLED device and transparent foil with an image.

An embodiment may further comprise:

reducing light output capacity of a second portion of the light emitting component to a second light output level, said second portion corresponding to a second portion with a second tone of said image, wherein applying said transparent image onto the OLED device further comprises said second portion of said image, at least partially, overlapping said second portion of the light emitting component.

The portion with the first tone of said image of the transparent image may be aligned with said first portion of the light emitting component. Depending on the method used to reduce the light output capacity of the light emitting component, alignment of the patterned image, i.e. portion(s) with reduced light output capacity with the transparent image, may produce a high contrast image. For instance, reduction of light output capacity by means of laser, or a mask image based on e.g. dithering, may provide a high contrast image by aligning the patterned image and the transparent image.

The portion with the second tone of the image of the transparent foil may be aligned with said second portion of the light emitting component. Thus, the transparent image may be overlapping the image patterned onto the OLED device, i.e. all portions with reduced light output capacity.

The reducing may comprise irradiating the first portion of the light emitting component with laser light. Laser irradiation may be beneficial in that no mask, such as a photolithography mask, needs to utilized, providing a cheaper alternative to mask technologies.

The reducing may comprise irradiating said second portion with laser light having a light intensity other than a light intensity of the laser light irradiating the first portion. Thereby, gray scaling may be achievable in the sense that different intensities provide different reduction of the light output capacity of the light emitting component. A wavelength of said laser light may be within an absorption band of the light emitting component of the OLED device. Thereby, a lower intensity of the laser may be utilized, below a deformation threshold.

The deformation threshold is defined as the highest light intensity which can irradiate a cathode, an anode, and the (organic) light emitting layer of the OLED device without causing physically, mechanically and/or thermally induced modifications in the cathode and anode, and without leaving visible marks on the (organic) light emitting layer.

Alternatively, the reducing may comprise applying a mask comprising a mask image based on the image, onto a substrate of said OLED device.

In one embodiment, the mask image may comprise a charge or current blocking layer such as an electrically insulating photoresist or structured insulator such as Siliconoxide, Siliconnitride, Metaloxides such as Aluminiumoxide etc, Metalonitrides such as Aluminiumnitride, which may be applied during the OLED device production process.

The mask image may be based on a gray scale image of said transparent image. Gray scaling, such as various dithering techniques, may be utilized to achieve such a mask image and may thereby reduce Moiré effects of the finished lighting device product due to interference of the (mask) image patterned onto the OLED device and the transparent image.

Alternatively, the applying may comprise rotating the transparent image with respect to the first portion of the light emitting layer. Thereby, Moiré effects may be reduced.

An embodiment may further comprise encapsulating the OLED device prior to the reducing a light output capacity. Irradiating the light emitting component after encapsulation may be beneficiary from a business perspective, as patterning of images may be performed on customer demand, off-site from a factory, on pre-produced OLED devices.

According to a second aspect of the present invention, there is provided a lighting device comprising:

an Organic Light Emitting Diode (abbreviated OLED) device comprising: a light emitting component comprising a first portion with reduced light emitting capacity; and a transparent image comprising a portion with a first tone, wherein said portion with the first tone of said image is, at least partially, overlapping said first portion of the light emitting component.

Generally, this second aspect may exhibit the same advantages and features as the first aspect.

The light emitting component may further comprise a second portion having a second light output level, the second portion corresponding to a second portion with a second tone of the transparent image, wherein said second portion of said image is, at least partially, overlapping said second portion of the emitting component.

The transparent image may be applied to a first side and a second side, opposite the first side, of said OLED device. Beneficially, this may provide views of the image from two opposite sides of the OLED device, enhancing the visual experience provided by the lighting device.

These and other aspects of the invention will be apparent from and elucidated with reference to the embodiments described hereinafter.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION OF EMBODIMENTS

Figure 1:
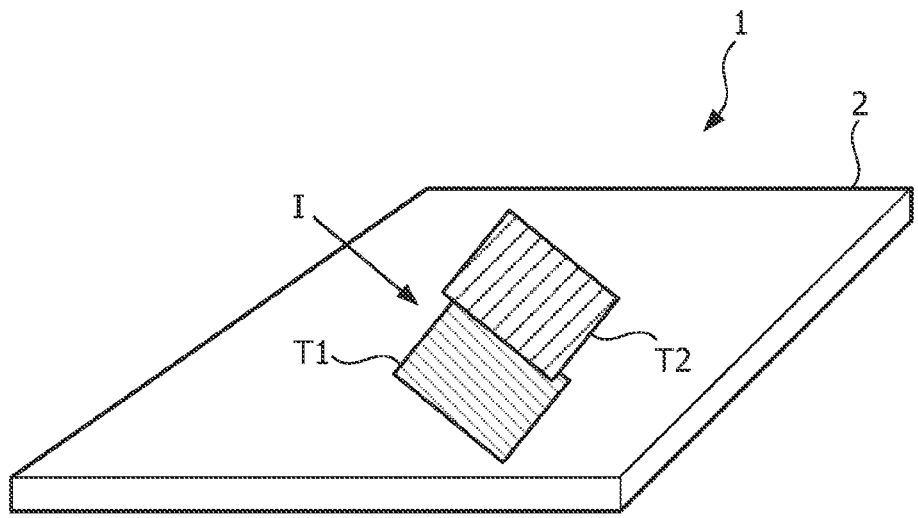
FIG. 1 shows a lighting device according to an embodiment of the invention.

FIG. 1 shows a lighting device 1 according to an embodiment of the invention. The inventive lighting device 1 comprises an OLED device 2, and a transparent image I. The OLED device 2 has reduced light output capacity in portions where the transparent image I has been applied to the OLED device 2. In particular, in this illustrative example, a first portion of the OLED device 2 has a reduced light output capacity corresponding to a first light output level, associated with a first tone T1 of the transparent image I, and a reduced light output capacity corresponding to a second light output level, associated with a second tone T2 of the image of the transparent foil F. Of course, other variations are also possible and within the scope of the invention.

In general, the idea is to pattern (i.e. reduce the light output capacity) the OLED device 1 according to the transparent image I and applying the transparent image I to the OLED device 2, wherein the patterned image of the OLED device 2 and the transparent image I (either color or gray scale image) are at least partially overlapping. The transparent image I may for instance be applied to the OLED device 2 by printing the image I onto the OLED device 2, or applying a transparent foil comprising the image I onto the OLED device 2.

The inventive method and device provides for the lighting device 1, when in an ON-state, an enhanced contrast of the transparent image I due to reduction of the light output capacity (e.g. gray scaling) of the OLED device 2 according to the luminance of the foil image.

Advantageously, the lighting device 1 is more economical in the sense that it has reduced power consumption.

The invention will now be described in more detail with reference to FIGS. 2-10.

Figure 2:
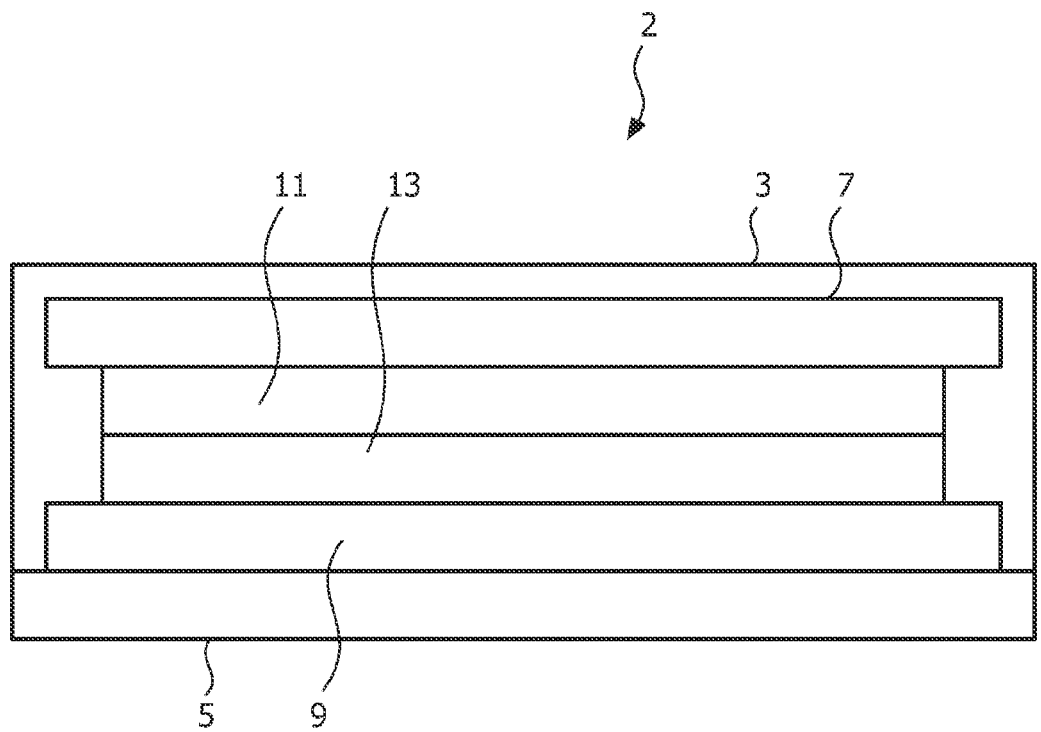
FIG. 2 shows a cross-sectional side view of an OLED device.

FIG. 2 shows a cross-sectional view of an embodiment of the OLED device 2 according to the invention. The OLED device 2 comprises an encapsulating body 3, made of e.g. glass, metal or other hermetic coatings for the protection from contamination, e.g. moisture or dirt, of internal components 7, 9, 11, 13. The encapsulating body 3 might also contain getters to absorb water which might have penetrated the encapsulation. Inside the encapsulating body 3, the OLED device 1 comprises a cathode 7, an anode 9 and a light emitting layer 11, i.e. an emissive layer, and an electrically conductive layer 13. The light emitting layer 11 and the conductive layer 13 together constitute the light emitting component C. These internal components may be placed on a substrate 5 made of e.g. glass, by e.g. placing the anode 9, conductive layer 13, the light emitting layer 11, and the cathode 7 in the mentioned order on the substrate 5. The light emitting layer 11 and the conductive layer 13 may be produced from an organic material such as a polymer or oligomer. The light emitting layer 11 or the conductive layer 13 may have specific absorption band properties.

When a positive voltage is applied to the anode 9 and the cathode 7, a current will flow through the light emitting component 11 and conductive layer 13, eventually resulting in electron-hole recombination and emission of light from the OLED device 2. For the emission of light through e.g. the anode 9, the anode 9 may comprise Indium tin-oxide (ITO), fluoridated zinc-oxide or another transparent conductor. Alternatively, the cathode 7 may also be transparent.

The function of the conductive layer 13 and anode 9 can in one embodiment be combined into one single layer.

Figure 3:
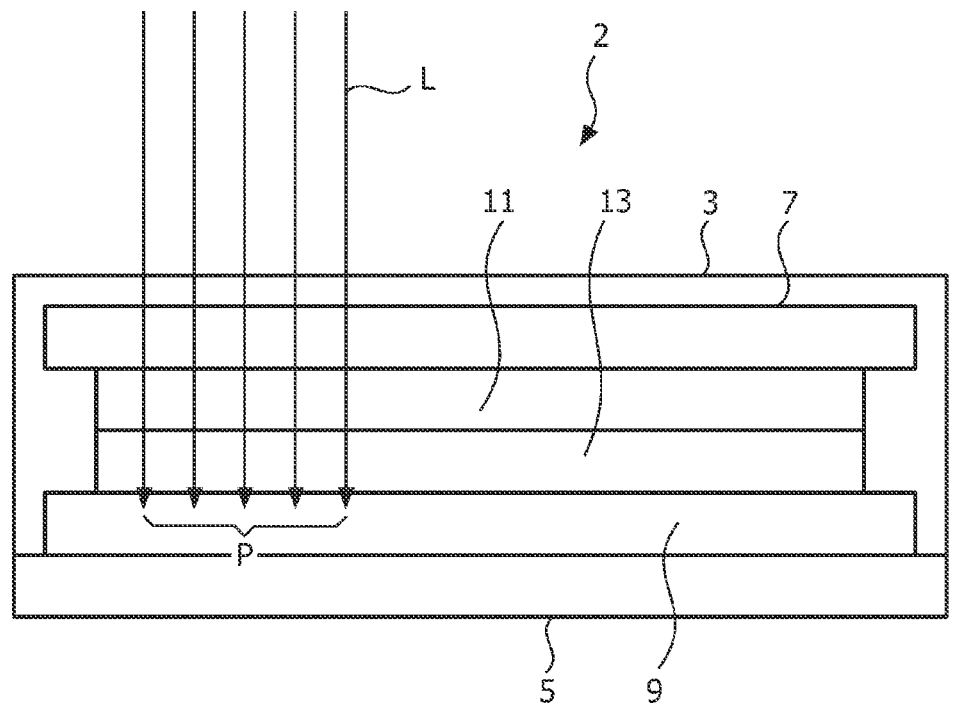
FIG. 3 shows a schematic view of reduction of a light output capacity of the OLED device in FIG. 2.

FIG. 3 shows a schematic view of reduction of a light output capacity of the OLED device 2 in FIG. 2. In the example shown in FIG. 3, laser light L irradiates the portion P in a horizontal plane of each layer (the encapsulating body 3, the cathode 7, the light emitting component 11, the conductive layer 13, the anode 9 and the substrate 5) as the laser light L passes through the OLED device 2. The laser light L may affect organic light emitting layer 11 or conductive layer 13, i.e. the light emitting component C, to a varying degree depending on a wavelength of the laser light L. Preferably, the wavelength of the laser light L is within an absorption band of the light emitting component C. If the laser light L has a wavelength within the absorption band of the light emitting or conductive layer 11 and 13, its molecular structure may change and reduce the light output capacity of the irradiated portion P of the light emitting component C, i.e. the light output capacity of the light emitting material in layer 11 or the conductive properties of the material in conductive layer 13 are locally changed. The light output capacity of the irradiated portion P of the light emitting layer is actually a function of both the wavelength of the laser light L and an intensity of the laser light L. Thus, the light output capacity of the light emitting layer 11 is also affected by the intensity of the laser light L; the higher the intensity is of an irradiating wavelength within the absorption band of the light emitting layer 11, the greater the reduction in light output capacity. The patterning effect, however, is largely governed by a total light dose, so gray scale effects may also be achieved using a constant laser intensity but different scanning speeds of a focused laser beam. In addition or in combination, writing hatch patterns with varying feature (line or dot) density can result in different gray scales.

Preferably, the intensity of the laser light L is below a deformation threshold of the cathode 7, the anode, 9, and light emitting component C. This may be advantageous for not leaving any visible signs on the OLED device 2 when in an OFF-state.

When the OLED device 2 is irradiated by laser light L from an external light source (not shown), such as a laser, light output capacity of an irradiated portion P of organic light emitting component C, having an absorption band comprising the wavelength of the irradiating laser light L, may be reduced. By way of example, a standard super-yellow OLED device may be irradiated with a frequency doubled Nd:YAG-laser with a 532 nm emissive wavelength, with its intensity adjusted to be below the deformation threshold.

For a blue-emitting polymer, a laser emitting light in the blue spectrum, e.g. 405 nm may be utilized. In particular, solid state lasers such as those used in Blu-Ray disc products may be used. Advantageously, this may allow a low-cost and compact system to fabricate patterned OLED devices 2.

For OLED devices based on small-molecule materials, the mechanism is different: wavelength-dependent laser irradiation typically mainly affects a conductive layer, thus locally reducing the current flow in the device, leading to locally reduced light emission from a light emitting layer.

In general, by altering the laser power and laser beam diameter, the laser intensity may be changed. Together with the laser scanning speed over the OLED device 1 during irradiation, the contrast of the pattern obtained by the reduced light output capacity of the irradiated portion P of the light emitting component C, may be controlled. By controlling these parameters, full gray scale patterning of the OLED device 1 may be possible.

The light L can be exposed through the cathode 7 if the latter is transparent but also through the anode 9.

Preferably, wavelengths below around 350 nm should be avoided, as these may damage the interface of the transparent conductive oxide, such as indium tin-oxide (ITO).

Figure 4:
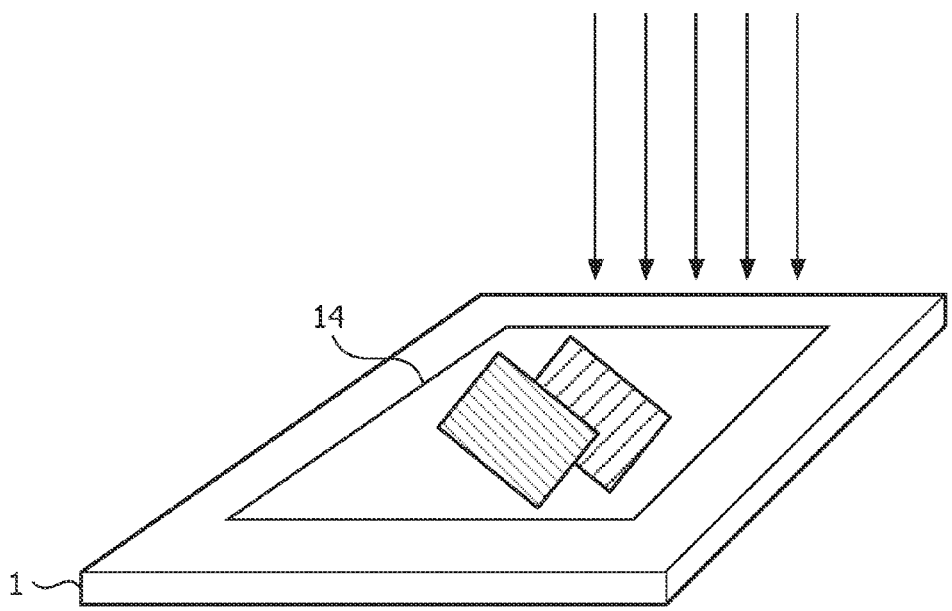
FIG. 4 shows a schematic view of reduction of a light output capacity of the OLED device in FIG. 2.

FIG. 4 shows a schematic view of reduction of a light output capacity of the OLED device 2 in FIG. 2. The light output capacity of the OLED device 2 may be reduced by utilizing a mask 14, e.g. a photolithography mask.

The transparent image I may be based on an original image that has been subject to image processing, such as dithering (ordered or random) e.g. the Floyd-Steinberg method, hatching or quantization, e.g. determining whether a point in the image is to be black or white, depending on whether a luminance threshold has been exceeded or not. Advantageously, the original image is converted into a black and white format. Such image processing is preferably used to produce the mask image. Moreover, the mask image may be, prior to utilizing it for the reduction of light output capacity, subject to for example gamma correction, i.e. the final contrast of the mask image may be tuned.

The mask 14, when applied to the OLED device 2, e.g. on the glass substrate 5 for a standard blue polymer device of bottom emission type (emission through the anode 9), may be illuminated by light with a wavelength in the ultraviolet (abbreviated UV) spectrum, thereby producing (patterning) the image on the OLED device 1. The OLED device 2 may e.g. have a first portion P1 with a first light output level, and a second portion P2 with a second light output level, as shown in FIG. 6.

Figure 6:
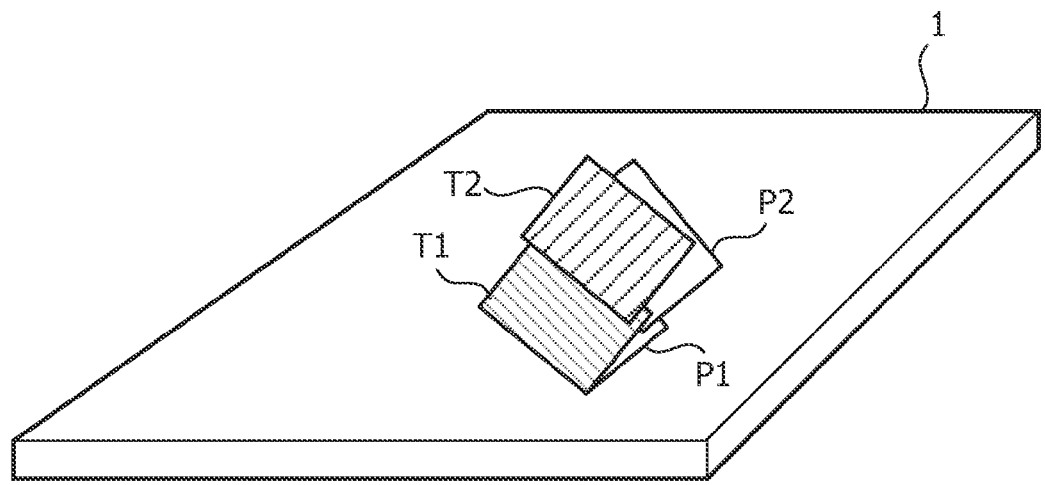
FIG. 6 shows a schematic view of an embodiment of a lighting device according to the invention.

The transparent image I may be applied to the OLED device 2, wherein e.g. the first portion P1 with reduced light output capacity is at least partially overlapping with a first portion of the image with the first tone T1 (see e.g. FIG. 6). In general, portions with reduced light output capacity of the OLED device 2 should be at least partially overlapping its corresponding image portion of the transparent image I. If image processing such as dithering is used, the image may be aligned with the portion(s) with reduced light output capacity.

In one embodiment, the image and the portions with reduced light output capacity of the OLED device 2 are slightly rotated with respect to each other. Advantages of e.g. dithering and rotation will be described in more detail below with reference to FIGS. 6 and 7.

Figure 5A:
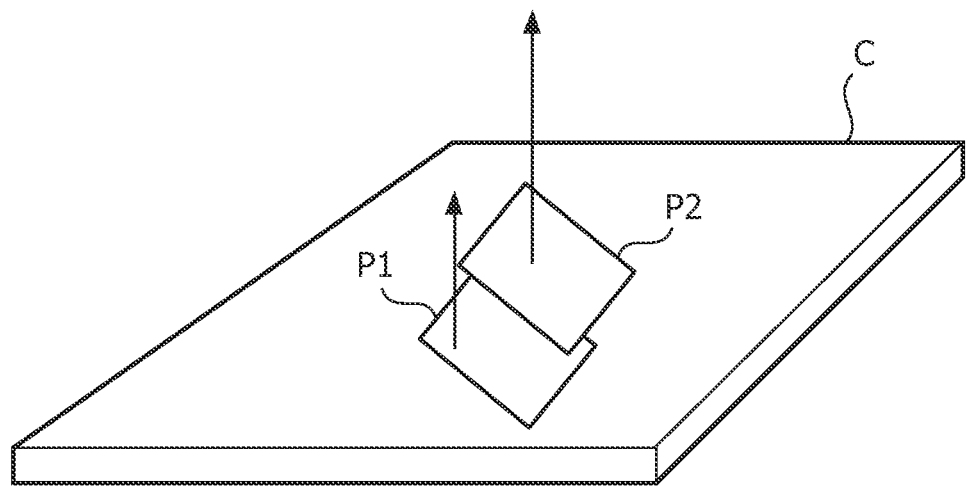
FIG. 5a. shows a schematic view of a light emitting component of an OLED device.

FIG. 5a shows a schematic view of the light emitting component C of the OLED device 1. For simplicity, only the light emitting component C is shown, however, it is to be understood that the same principles apply for the OLED device 2 in general.

The light emitting component C of the OLED device 2 has in this example been irradiated by laser light as described above. A portion P1 has been irradiated with laser light having a first intensity, the laser light having a wavelength within the absorption band of the light emitting component C, thereby reducing the light output capacity of the light emitting component C to a first output level. A portion P2 has been irradiated with laser light having a second intensity, different from the first intensity having irradiated portion P1. The wavelength of the laser light that has irradiated the portion P2 is also within the absorption band of the light emitting component C. The light output capacity of the light emitting component C is thereby reduced to a second output level, different from the first output level. In this example, a two-toned gray scale is thus created. Assuming that the first intensity is greater than the second intensity, the first output level will be more reduced than that of the second output level, as illustrated by the arrows in FIG. 5a.

The irradiation may take place when the OLED device 2 has been encapsulated in the encapsulating body 3. Alternatively, the irradiation may take place prior to the encapsulation.

In one embodiment a white light emitting OLED device 1 can be used. OLED devices of this type may comprise a mixture of light emitting components, each having different light absorption spectra. For polymers, irradiating with blue light will reduce light emission for all light components leaving a gray to black appearance. Using larger wavelengths can result in selective color degradation (only from large wavelength side of the spectrum), e.g. locally removing red emission leaves a greenish color, etc.

Figure 5B:
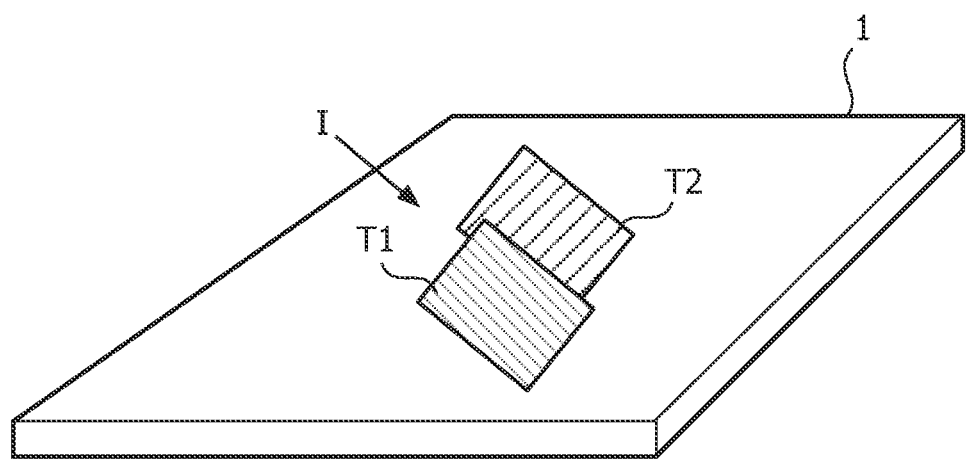
FIG. 5b. shows a schematic view of the lighting device in FIG. 1

FIG. 5b. shows a schematic view of the OLED device 2 in FIG. 1. The transparent image I has been applied to the encapsulated OLED device 2. The transparent image I can be a color image or a gray scale image, with the first and the second tone T1 and T2 respectively. The transparent image I has been applied to the OLED device 2 such that a portion of the image comprising the first tone Ti is aligned with the portion P1 of the light emitting component C, and a portion of the image comprising the second tone T2 is aligned with the portion P2 of the light emitting component C.

In this example, the first tone T1 has a lower luminance value, i.e. is of darker shade, than the second tone T2. The first light output level of the portion P1 may be such that its luminance value is based on the luminance value of the first tone T1. Accordingly, the second light output level of the portion P2 may be such that its luminance value is based on the luminance value of the second tone T2. In one embodiment, the luminance values of the portions P1 and P2 may be the same as the luminance values of the first and second tones T1 and T2.

In general, contrast of an image may be improved. Dark areas in the image I may be really dark, since less or no light is generated in those areas.

Moreover, by providing the OLED device 1 with portions having reduced light output capacity, the portions with reduced light output capacity, where some portions may even be non-emitting, may have reduced power consumption or no power consumption. Thereby, the power consumption of the OLED device 2 may be significantly lower than that of an unpatterned device under otherwise identical conditions.

Hence, improved contrast of the image may be achieved, as well as an energy-saving lighting device 1.

FIG. 6 shows a schematic view of an embodiment of the lighting device 1 according to the invention. In this example, the reduced light output capacity of the OLED device 2 is due to a mask, such as a photolithography mask as described above.

Figure 7:
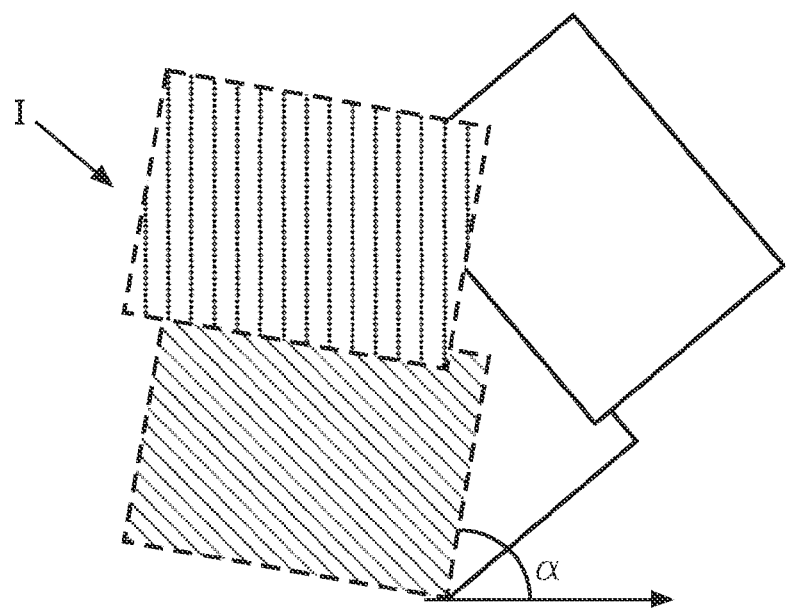
FIG. 7 shows a rotation of a transparent foil with respect to a portion of the OLED device in FIG. 6.

The portions P1 and P2 have reduced light output capacity with a first light output level and a second light output level respectively. The transparent image I has been applied to the encapsulated OLED device 2, slightly rotated by an angle a with respect to the portions P1 and P2, as shown in FIG. 7. However, the part of the transparent image I with the first tone T1 is partially overlapping the portion P1 and the part of the image with the second tone T2 is partially overlapping the portion P2.

The image is rotated to reduce unwanted interference, i.e. a Moiré effect, which may arise when using a mask for the reduction of light output capacity of the OLED device 2. Alternatively, the portions P1 and P2 may be slightly rotated with respect to the transparent image I (which is to be applied later) during fabrication.

As an illustrative example of energy-saving, at a fixed voltage of 5 V, the present OLED device 2 may for a specific foil image and corresponding OLED patterning consume 20 mA, whereas for an unpatterned OLED device, the consumption of current may be 73 mA.

In general, for the OLED device 2 using a mask for reduction of light output capacity, quantization methods, dithering or hatching may be utilized to avoid the Moiré effects.

Figure 8:
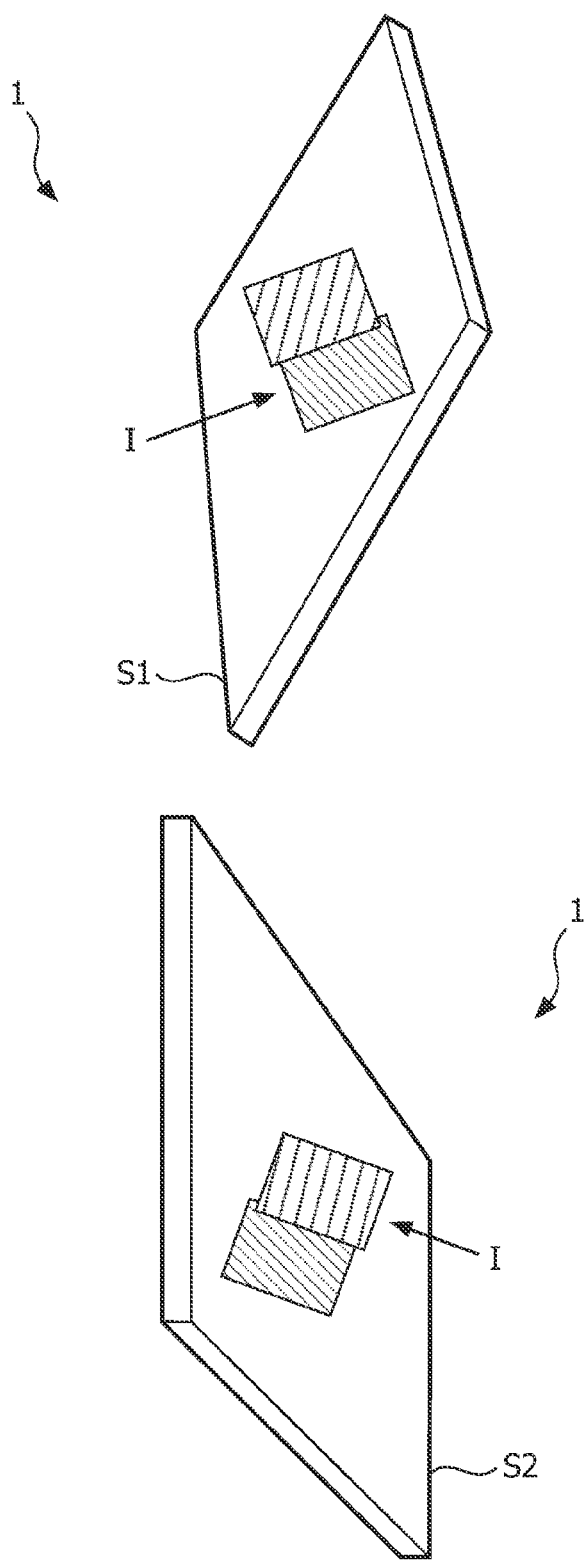
FIG. 8 shows an embodiment of a lighting device according to an embodiment of the invention.

FIG. 8 shows an embodiment of the lighting device 1 according to the invention. The OLED device 2 has in this example the transparent image I applied to a first side S1 and a second side S2 of the OLED device 2, the first side and second side being opposite sides of the OLED device 2. The transparent image I may have been applied according to any method disclosed herein. The reduction of light output capacity of the OLED device 1 may also have been performed according to any light reduction method disclosed herein.

Figure 9:
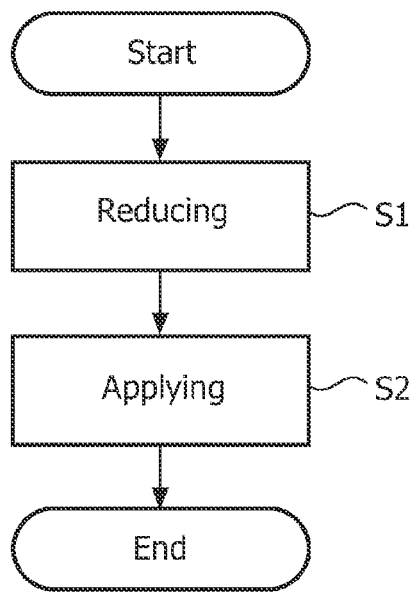
FIG. 9 shows a flow chart illustrating production of a lighting device according to an embodiment of the invention.
Figure 10:
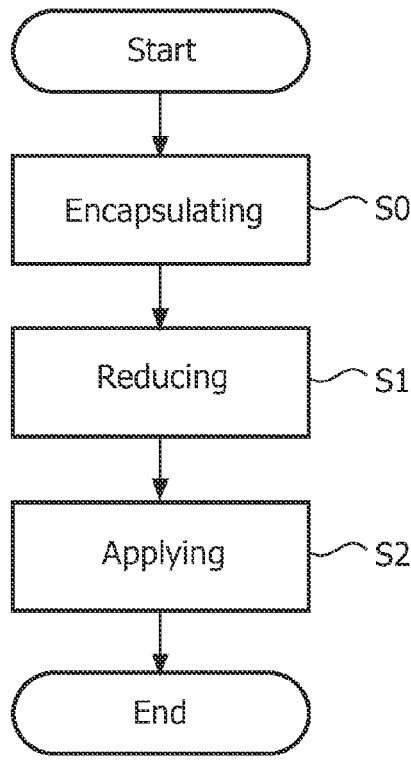
FIG. 10 shows a flow chart illustrating production of a lighting device according to an embodiment of the invention.
Figure 11:
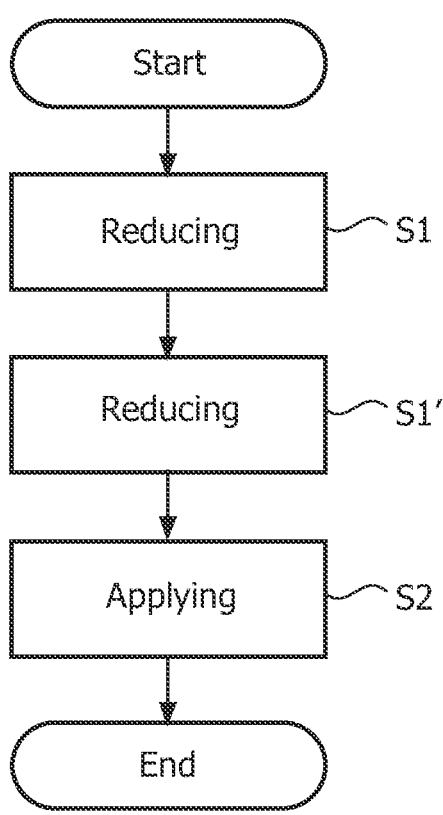
FIG. 11 shows a flow chart illustrating production of a lighting device according to an embodiment of the invention.

FIGS. 9-11 shows flow charts illustrating production of the lighting device 1 according to an embodiment of the invention.

In an optional step S0, the OLED device 2 is encapsulated in an encapsulating body 3.

In a step S1, the light output capacity of a first portion P1 of the light emitting component C is reduced to a first light output level corresponding to a portion of an image having a first tone T1, i.e. a first luminance value.

In an optional step S1', the light output capacity of a second portion P2 of the light emitting component C is reduced. The second portion P2 of the light emitting component C corresponds to a second portion with a second tone T2 of the transparent image I. When applying the transparent image I in step S2 below, the second portion with the second tone T2 of the foil image is, at least partially, overlapping the second portion P2 of the light emitting component C.

In a step S2, the transparent foil image I is applied to the OLED device 1. The portion with the first tone T1 of the image I is, at least partially, overlapping the first portion P1 with reduced light output capacity. If laser irradiation has been utilized to reduce the light output capacity of the light emitting component C, the irradiated portion(s) is aligned with its corresponding image portion of the transparent image I.

Alternatively, if reduction of light output capacity is due to utilizing a mask, the image may be rotated with respect to the pattern of the light emitting layer 11. Alternatively, the pattern of the light emitting layer 11 itself may be rotated with respect to the image.

In one embodiment, the applying the transparent image I onto the OLED device 2 can comprise applying a transparent foil comprising the image, i.e. having the image printed thereon.

The transparent foil may be applied by glue, lamination, clamping or other means, as a skilled person readily will understand.

Alternatively, the image I can be directly printed onto the OLED device 2.

In one embodiment, the image I may be applied to a first side and a second side, opposite the first side, of the OLED device 2. Advantageously, the image I may be viewed from two opposite sides of the OLED device 2 when the OLED device 2 is in the ON-state.

In one embodiment when using a mask for reducing the light output capacity of the light emitting layer 11, the mask image used to pattern the OLED device 2 may be based on an original image that has been subject to image processing, such as dithering (ordered or random) e.g. the Floyd-Steinberg method, hatching or quantization. Such image processing is preferably used to produce the mask. Moreover, the mask image may be, prior to utilizing it for the reduction of light output capacity, subject to gamma correction, i.e. the final contrast of the mask image may be tuned.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Furthermore, any reference signs in the claims should not be construed as limiting the scope.

The invention claimed is:

1. A method for producing a lighting device comprising an OLED device and a transparent image with a portion having a first tone, said OLED device comprising a light emitting component, the method comprising:
   reducing a light output capacity of a first portion of the light emitting component to a first light output level, said first portion corresponding to said portion with said first tone of said transparent image such that at least partial overlapping of said transparent image over said first portion of the light emitting component enhances contrast between features of said transparent image; and
   applying the transparent image onto the OLED device, wherein said portion with the first tone of said transparent image, at least partially, overlapping said first portion of said light emitting component.

2. The method as claimed in claim 1, further comprising:
   reducing light output capacity of a second portion of said light emitting component to a second light output level, said second portion corresponding to a second portion with a second tone of said transparent image, wherein applying said transparent image onto the OLED device further comprises said second portion of said image, at least partially, overlapping said second portion of the light emitting component.

3. The method as claimed in claim 1, wherein said portion with the first tone of said transparent image is aligned with said first portion of the light emitting component.

4. The method as claimed in claim 2, wherein said second portion with the second tone of said transparent image is aligned with said second portion of the light emitting component.

5. The method as claimed in claim 1, wherein said reducing comprises irradiating the first portion of the light emitting component with laser light.

6. The method as claimed in claim 2, wherein said reducing comprises irradiating the first portion of the light emitting component with laser light and wherein said reducing of the second portion of said light emitting component comprises irradiating said second portion of said light emitting component with laser light having a light intensity other than a light intensity of the laser light irradiating the first portion of the light emitting component.

7. The method as claimed in claim 5, wherein a wavelength of said laser light is within an absorption band of said light emitting component.

8. The method as claimed in claim 1, wherein said reducing comprises applying a mask comprising a mask image based on said transparent image, onto a substrate of said OLED device.

9. The method as claimed in claim 8, wherein said mask image is based on a gray scale image of said transparent image.

10. The method as claimed in claim 8, wherein said applying comprises rotating the transparent image with respect to said first portion of the light emitting component.

11. The method as claimed in any one of the preceding claims, further comprising encapsulating said OLED device prior to said reducing a light output capacity.

12. A lighting device comprising:
   an OLED device comprising:
   a light emitting component comprising a first portion with reduced light emitting capacity; and
   a transparent image comprising a portion with a first tone, wherein said portion with the first tone of said transparent image is, at least partially, overlapping said first portion of the light emitting component and wherein the reduced light emitting capacity of said light emitting component enhances contrast between features of said transparent image.

13. The lighting device as claimed in claim 12, wherein said light emitting component further comprises a second portion having a second light output level, said second portion corresponding to a second portion with a second tone of said transparent image, wherein said second portion with the second tone of said transparent image is, at least partially, overlapping said second portion of the light emitting component.

14. The lighting device as claimed in claim 12, wherein said transparent image is applied to a first side and a second side, opposite said first side, of said OLED device.

15. A method for producing a lighting device comprising an OLED device and a transparent image with a portion having a first tone, said OLED device comprising a light emitting component, the method comprising:
   reducing a light output capacity of a first portion of the light emitting component to a transparent image, wherein said reducing comprises applying a mask that is based on said transparent image onto a substrate of said OLED device; and applying the transparent image onto the OLED device, wherein said portion with the first tone of said transparent image is, at least partially, overlapping said first portion of said light emitting component.

16. The method as claimed in claim 15, wherein said mask includes a mask image that is based on a gray scale image of said transparent image.

17. The method as claimed in claim 15, wherein said applying comprises rotating the transparent image with the respect to said first portion of the light emitting component.

* * * * *